United States Patent
Grayson (12)

(10) Patent No.: US 6,193,882 B1
(45) Date of Patent: Feb. 27, 2001

(54) PRESSURIZED BRINING SYSTEM

(75) Inventor: John R. Grayson, Inverness, IL (US)

(73) Assignee: RSWC Inc., Inverness, IL (US)

( * ) Notice: Subject to any disclaimer, the term of this patent is extended or adjusted under 35 U.S.C. 154(b) by 0 days.

(21) Appl. No.: 09/094,871

(22) Filed: Jun. 15, 1998

(51) Int. Cl.[7] .............................. B01D 11/02; B01J 49/00
(52) U.S. Cl. .................... 210/190; 210/251; 210/257.2; 422/261; 422/902
(58) Field of Search ................................. 210/190, 191, 210/257.2, 321.6, 541, 251; 422/902, 261, 291

(56) References Cited

U.S. PATENT DOCUMENTS

| | | | |
|---|---|---|---|
| Re. 30,179 | 12/1979 | Li et al. ................................. | 210/633 |
| 2,919,805 | * 1/1960 | Nickols ................................. | 210/190 |
| 3,432,038 | * 3/1969 | Heskett ................................. | 210/190 |
| 3,627,133 | 12/1971 | Rak ....................................... | 210/98 |
| 4,289,600 | 9/1981 | Lazarz et al. ....................... | 204/296 |
| 4,426,285 | 1/1984 | Davis .................................... | 210/109 |
| 4,448,682 | 5/1984 | Moritz ................................... | 210/101 |
| 4,652,364 | 3/1987 | Shirato et al. ........................ | 210/87 |
| 4,889,623 | 12/1989 | Prior et al. ........................... | 210/190 |
| 4,992,208 | 2/1991 | Ireland ................................. | 210/687 |
| 5,034,127 | 7/1991 | Yagishita et al. .................... | 210/337 |
| 5,068,092 | 11/1991 | Aschauer ............................. | 422/253 |
| 5,152,901 | 10/1992 | Hodgon ................................ | 210/654 |
| 5,254,257 | 10/1993 | Brigano et al. ...................... | 210/639 |
| 5,395,497 | 3/1995 | Bourgeois ............................ | 210/650 |
| 5,458,781 | 10/1995 | Lin ....................................... | 210/651 |
| 5,536,479 | 7/1996 | Miller et al. ......................... | 422/261 |
| 5,587,083 | 12/1996 | Twardowski ......................... | 210/652 |

* cited by examiner

Primary Examiner—Ivars Cintins
(74) Attorney, Agent, or Firm—Seyfarth Shaw

(57) ABSTRACT

A water softening system includes a resin tank which has an open drain during a regeneration cycle, and a pressurized brining system communicating with the resin tank. The brining system includes a closed brine reservoir with an outlet communicating with the resin tank and an inlet adapted to be coupled to a pressurized source of water, a salt reservoir at atmospheric pressure, and a semi-permeable membrane in communication with and forming a partition between the reservoirs and allowing free movement of salt ions therethrough while substantially inhibiting flow of water therethrough to form brine in the brine reservoir, which brine is then urged through the brine outlet and into the resin tank by the water pressure in the brine reservoir.

20 Claims, 2 Drawing Sheets

PRESSURIZED BRINING SYSTEM

BACKGROUND OF THE INVENTION

1. Field of the Invention

The present invention relates to water treatment systems, such as water softening systems and, in particular, to brining systems for use in regenerating the treatment material in the water treatment system.

2. Description of the Prior Art

In water softening systems, hard water typically enters the top of a pressure tank through an inlet line, and percolates through a bed of treatment material, which may be a suitable resin, such as Zeolite, for softening the water. More particularly, as the hard water percolates through the resin bed, an ion exchange occurs in which sodium ions held by the resin are exchanged for the "hard" metal ions in the water. The softened water then passes out of the pressure tank through an outlet line. The water softening ability of the resin bed is gradually reduced through use and, after a predetermined quantity of hard water has been softened, the resin bed becomes depleted of sodium ions.

The resin bed is regenerated by passing a brine solution through it so that the ion exchange process is reversed, after which the waste brine solution exits through a drain outlet. Typically, the brine is aspirated into the pressure tank from a brine reservoir, as by suction created by a venturi through a valve mechanism. But the venturi and valve mechanism frequently become plugged or clogged in use, which can interfere with the proper flow of brine and result in improper regeneration. Also, if the back pressure in the system becomes too great, such as through a kink in the waste brine drain line, the aspiration mechanism may malfunction. Additionally, the venturi will not create suction if the inlet pressure is too low, so it will not work properly in areas where water pressure is inadequate.

SUMMARY OF THE INVENTION

It is a general object of the invention to provide an improved water softening system and brining system therefor, which avoids the disadvantages of prior systems while affording additional structural and operating advantages.

An important feature of the invention is the provision of a brining system which does not rely on suction to draw brine from a brine reservoir.

In connection with the foregoing feature, another feature of the invention is the provision of a pressurized brining system.

A further feature of the invention is the provision of a brining system of the type set forth which is of simple and economical construction.

Yet another feature of the invention is the provision of a water softening system incorporating a brining system of the type set forth.

Certain ones of these and other features of the invention may be attained by providing a pressurized brining system comprising: a semi-permeable membrane allowing free movement of salt ions therethrough while substantially inhibiting flow of water therethrough, a salt reservoir communicating with one side of the membrane, and a closed brine reservoir communicating with the opposite side of the membrane, the brine reservoir having a brine outlet and a water inlet adapted to be coupled to a pressurized source of water, the reservoirs being arranged so that salt ions flow from the salt reservoir to the brine reservoir to form brine therein and the brine is urged through the brine outlet by the water pressure in the brine reservoir.

Other features of the invention may be attained by providing a water softening system comprising: a resin tank including structure for defining a flow path for water to be treated, regenerating apparatus for regenerating exhausted resin in the resin tank and defining an open drain path from the resin tank during a regeneration cycle, a closed brine reservoir having an outlet communicating with the resin tank and an inlet adapted to be coupled to a pressurized source of water, a salt reservoir at atmospheric pressure, and a semi-permeable membrane in communication with and forming a partition between the reservoirs and allowing free movement of salt ions therethrough while substantially inhibiting flow of water therethrough, the reservoirs being arranged so that salt ions flow from the salt reservoir to the brine reservoir to form brine therein and the brine is urged through the brine outlet and into the resin tank by the water pressure in the brine reservoir.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENTS

Figure 1:
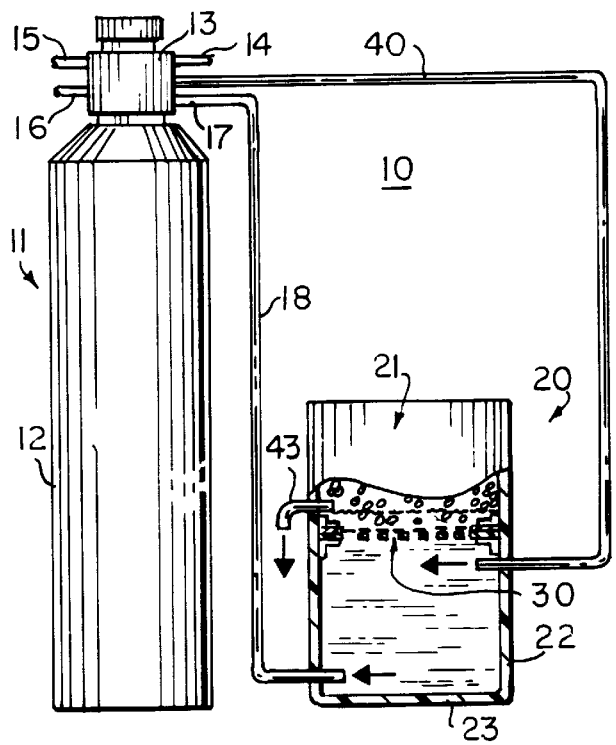
FIG. 1 is a side elevational view in partial section of a water softening system incorporating a brining system in accordance with a first embodiment of the present invention.

Referring to FIG. 1, there is illustrated a water softening system 10 including a water softener 11 and a brining system 20 in accordance with the present invention. The water softener 11 includes a pressure vessel in the nature of a resin tank 12, for accommodating a bed of treatment material, such as a suitable resin, in a known manner. The resin tank 12 is provided at its upper end with a valve assembly 13, generally of known construction, and including a hard or raw water inlet 14 and a soft water outlet 15. The valve assembly 13 may be provided with a suitable timer to control the operation thereof through the various cycles of the water softening system 10, in a known manner. The resin tank 12 is also provided with a waste brine drain outlet 16 and a brine inlet 17 communicating with a brine conduit 18. Typically the brine inlet 17 and drain 16 are connected through the valve assembly 13.

Figure 2:
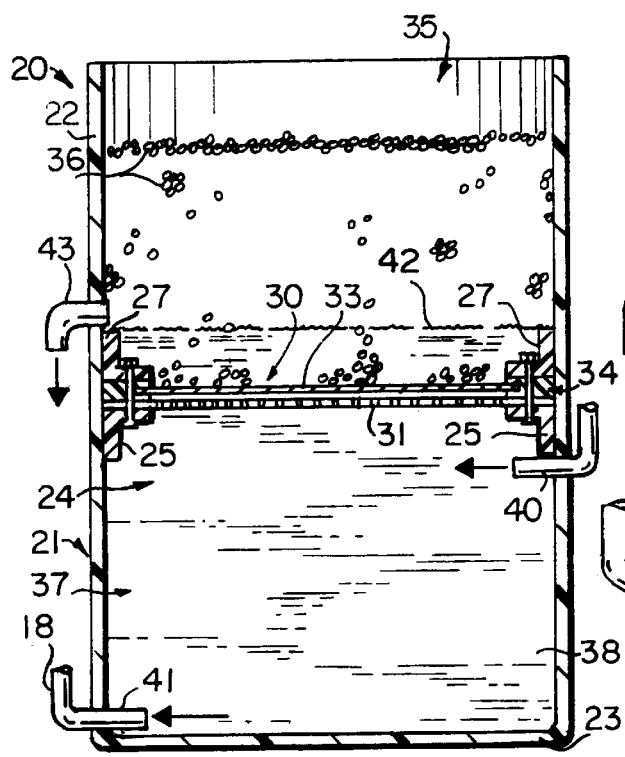
FIG. 2 is an enlarged, fragmentary, sectional view of the brining system of FIG. 1.
Figure 3:
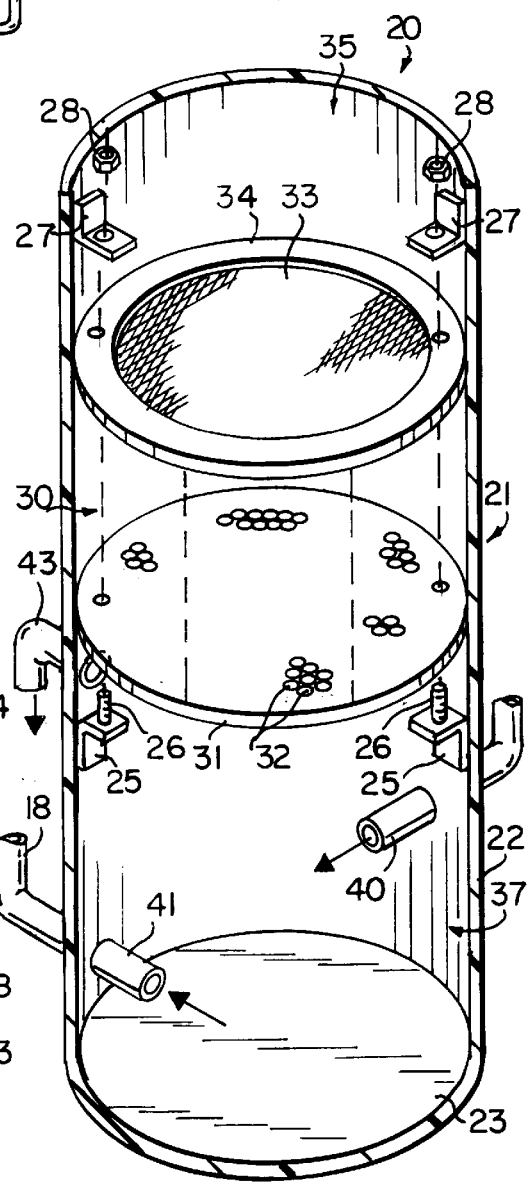
FIG. 3 is an exploded, perspective view of the section of FIG. 2.

Referring also to FIGS. 2 and 3, the brining system 20 includes a housing 21 having a generally cylindrical, upstanding side wall 22 closed at the lower end thereof by a circular bottom wall 23. Carried by the side wall 22 intermediate its upper and lower ends is a support assembly 24, which includes a plurality of lower brackets 25 fixed to the inner surface of the side wall 22 and each having a radially inwardly extending arm provided with an upstanding threaded stud 26. Preferably, the brackets 25 are three in number and are equiangularly spaced around the circumference of the side wall 22, although only two are shown. Respectively associated with the lower brackets 25 are a like number of upper clamps 27, which are respectively adapted to be fitted down over the studs 26 and secured in place by associated nuts 28. While a plurality of brackets 25 and corresponding upper clamps 27 are illustrated, it will be appreciated that they could be replaced with a single annular lower clamp with circumferentially spaced studs 26 and a cooperating upper annular clamp.

Clamped between the lower brackets 25 and the upper clamps 27 is a partition assembly, generally designated by the numeral 30, which includes a substantially rigid, circular support plate 31 supported on the lower brackets 25 and provided with a plurality of perforations 32 therethrough substantially uniformly distributed throughout the area thereof for accommodating free passage of water therethrough. Overlying the support plate 31 (or, if desired, disposed immediately therebeneath) is a semi-permeable membrane 33 having an annular peripheral support ring 34. The membrane 33 may be of any of a number of different types of known constructions, and is preferably designed to freely permit the passage of salt ions therethrough, while substantially inhibiting the free passage of water therethrough. Preferably, the support plate 31 and the support ring 34 have openings therethrough for receiving the studs 26.

The partition assembly 30 divides the housing 21 into an upper salt reservoir 35 which contains salt 36, and a lower pressurized brine reservoir 37 containing a brine solution 38. The salt 36 is illustrated in FIGS. 1 and 2 as being of a granular or pelletized form, but it will be appreciated that salt in other forms could also be used. The support plate 31 provides stiffening and rigidfying support for the semi-permeable membrane 33 and is designed to have sufficient strength and rigidity so as to support the load of salt 36 in the salt reservoir 35 and prevent damage to the membrane 33.

The salt reservoir 35 is open to atmosphere, but the brine reservoir 37 is closed, being provided with a water inlet 40 which is adapted to be coupled to an associated pressurized source of water, and a brine outlet 41 communicating with the brine conduit 18. While the semi-permeable membrane 33 is designed to substantially inhibit the flow of water therethrough, it may permit some water to pass therethrough, depending upon the pressure of the incoming water and the resulting pressure gradient across the membrane 33. Thus, brine may accumulate in the salt reservoir 35 to a level 42, at which an overflow drain 43 is located. The water inlet 40 could be connected independently to a pressurized water source, but is typically coupled through the valve assembly 13 to the pressurized water inlet line 14, with a pressurized water path being opened through the valve assembly 13 to the brine reservoir 37 during each regeneration cycle.

In operation, pressurized water is initially admitted to the brine reservoir 37 through the water inlet 40, filling the brine reservoir 37. Salt ions then pass through the membrane 33 into the water in the brine reservoir 37 to form brine therein. Once the brine reservoir 37 is filled, it will essentially remain filled thereafter, so that the brine forming process occurs continuously, with brine sinking to the bottom of the reservoir 37, so that the most concentrated brine is at the bottom. During the regeneration cycle, when the water inlet 40 is opened to the pressurized water source, the water pressure will force brine through the brine outlet 41 and the brine conduit 18, through the brine inlet 17 of the resin tank 12 and into the resin bed therein, and then out the waste brine drain 16, which remains open at all times. The flow of brine through the system will cease when the flow of pressurized water into the brine reservoir 37 ceases, at the end of the regeneration cycle. Thus, there is no need for a venturi suction system to draw the brine out of the brine reservoir 37.

Figure 4:
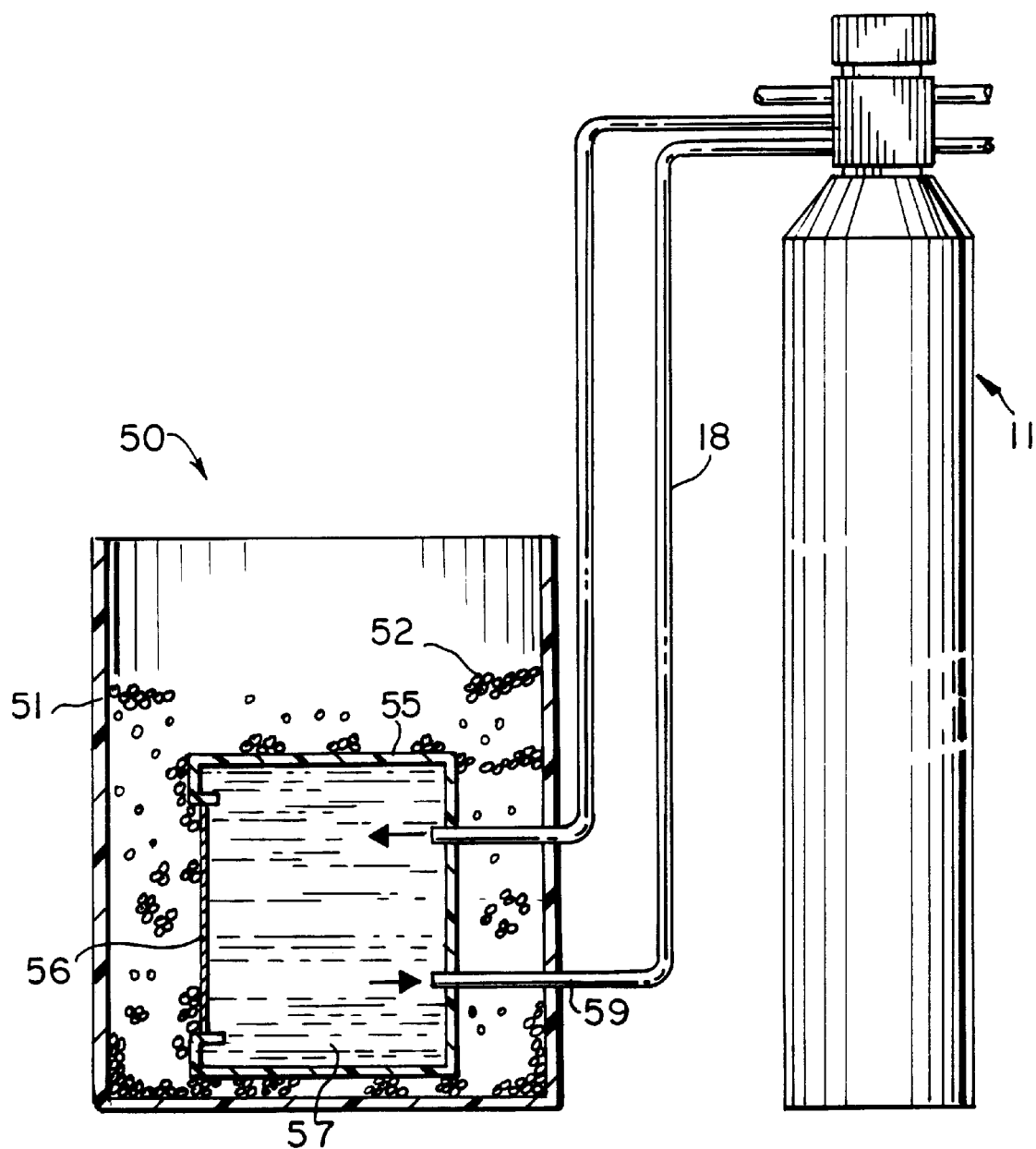
FIG. 4 is an enlarged view similar to FIG. 1, illustrating in section a brining system in accordance with a second embodiment of the invention.

Referring to FIG. 4, there is illustrated an alternative embodiment of the invention, incorporating brining system 50, which includes an open-top salt/brine reservoir 51 which is typically filled with brine and into which salt 52 is added, as needed. Disposed within the salt/brine reservoir 51 is a closed, pressurized brine reservoir 55, at least a portion of the wall structure of which is formed by a semi-permeable membrane 56, like the membrane 33 of the brining system 20. The brine reservoir 55 is filled with brine 57 and is provided with a water inlet 58 which communicates through a complementary opening in the side wall of the reservoir 51 with an associated source of pressurized water. The brine reservoir 55 is also provided with a brine outlet 59, which also communicates through a complementary opening in the wall of the salt/brine reservoir 51 with the brine conduit 18. In use, the brining system 50 operates in substantially the same manner as was described above in connection with the brining system 20, except that no support assembly for the membrane 56 is necessary.

Preferably, all of the parts of the water softening system 10 and the brining systems 20 and 50 which come in contact with salt or water are formed of non-metallic, corrosion-resistant materials, and all of the structural elements may be formed of suitable plastics, fiberglass or the like, all in a known manner.

From the foregoing, it can be seen that there has been provided an improved pressurized brining system, and a water softening system incorporating same, which do not require suction of brine from the brine reservoir.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A pressurized brining system comprising:
    a semi-permeable membrane allowing free movement of salt ions therethrough while substantially inhibiting flow of water therethrough,
    a salt reservoir containing a quantity of salt, and
    a closed brine reservoir,
    said brine reservoir having a brine outlet and a water inlet adapted to be coupled to a pressurized source of water,
    said membrane forming a partition between said reservoirs so that one side of said membrane is exposed to contents of said salt reservoir and an opposite side of said membrane is exposed to contents of said brine reservoir, said reservoirs being arranged so that salt ions flow from said salt reservoir to said brine reservoir to form brine therein and the brine is urged through said brine outlet by the water pressure in said brine reservoir.

2. The brining system of claim 1, wherein said salt reservoir is open to atmosphere.

3. The brining system of claim 1, wherein said membrane is disposed at the top of said brine reservoir.

4. The brining system of claim 1, wherein said membrane permits limited flow of water therethrough if the pressure in the brine reservoir exceeds that in the salt reservoir by a sufficient amount.

5. The brining system of claim 4, and further comprising an overflow drain outlet in said salt reservoir.

6. The brining system of claim 1, wherein said reservoirs respectively define non-overlapping volumes.

7. The brining system of claim 1, wherein said brine reservoir is disposed within said salt reservoir.

8. A pressurized brining system comprising:

a closed brine reservoir, a salt reservoir containing a quantity of salt overlying said brine reservoir, and a semi-permeable membrane forming a partition between said brine reservoir and said salt reservoir so that one side of said membrane is exposed to contents of said salt reservoir and an opposite side of said membrane is exposed to contents of said brine reservoir and allowing free movement of salt ions therethrough while substantially inhibiting flow of water therethrough, said brine reservoir having a brine outlet and an inlet adapted to be coupled to a pressurized source of water.

9. The brining system of claim 8, wherein said reservoirs have a common side wall structure.

10. The brining system of claim 9, and further comprising support brackets fixed to said side wall structure for supporting said membrane thereon.

11. The brining system of claim 8, and further comprising support structure between said reservoirs for supporting the weight of salt in said salt reservoir.

12. The brining system of claim 11, wherein said support structure includes a perforated plate.

13. The brining system of claim 8, wherein said membrane permits limited flow of water therethrough if the pressure in the brine reservoir exceeds that in the salt reservoir by a sufficient amount.

14. The brining system of claim 13, and further comprising an overflow drain outlet in said salt reservoir.

15. A water softening system comprising:

a resin tank including structure for defining a flow path for water to be treated, regenerating apparatus for regenerating exhausted resin in said resin tank and defining an open drain path from said resin tank during a regeneration cycle, a closed brine reservoir having an outlet communicating with said resin tank and an inlet adapted to be coupled to a pressurized source of water, a salt reservoir containing a quantity of salt at atmospheric pressure, and a semi-permeable membrane forming a partition between said reservoirs so that one side of said membrane is exposed to contents of said salt reservoir and an opposite side of said membrane is exposed to contents of said brine reservoir and allowing free movement of salt ions therethrough while substantially inhibiting flow of water therethrough, said reservoirs being arranged so that salt ions flow from said salt reservoir to said brine reservoir to form brine therein and the brine is urged through said brine outlet and into said resin tank by the water pressure in said brine reservoir.

16. The water softening system of claim 15, wherein said salt reservoir is open to atmosphere.

17. The water softening system of claim 15, wherein said membrane is disposed at the top of said brine reservoir.

18. The water softening system of claim 15, wherein said membrane permits limited flow of water therethrough if the pressure in the brine reservoir exceeds that in the salt reservoir by a sufficient amount.

19. The water softening system of claim 18, and further comprising an overflow drain outlet in said salt reservoir.

20. The water softening system of claim 15, wherein said reservoirs respectively define non-overlapping volumes.

\* \* \* \* \*